United States Patent [19] [11] 3,897,545
Reh et al. [45] July 29, 1975

[54] PROCESS FOR CATALYTICALLY REACTING GASES HAVING A HIGH $SO_2$ CONTENT USING DIFFERENT CATALYSTS

[75] Inventors: Lothar Reh, Bergen-Enkheim; Karl-Heinz Dorr, Mainz; Hugo Grimm, Frankfurt am Main; Karel Vydra, Bad Nauheim, all of Germany

[73] Assignee: Metallgesellschaft Aktiengesellschaft, Frankfurt am Main, Germany

[22] Filed: Mar. 21, 1973

[21] Appl. No.: 343,584

[30] Foreign Application Priority Data
Mar. 21, 1972 Germany............................ 2213580

[52] U.S. Cl................................. 423/534; 423/522
[51] Int. Cl............................................... C01b 17/78
[58] Field of Search........... 423/521, 522, 528, 532, 423/533, 534, 535, 536, 537, 538

[56] References Cited
UNITED STATES PATENTS
| | | | |
|---|---|---|---|
| 690,133 | 12/1901 | Clemm et al. | 423/534 |
| 729,735 | 6/1903 | Clemm et al. | 423/534 |
| 1,965,963 | 7/1934 | Merrian | 423/533 |
| 2,042,675 | 7/1936 | Merrian | 423/528 |
| 3,005,687 | 10/1961 | Udy | 423/522 |

FOREIGN PATENTS OR APPLICATIONS
46-30089  1/1971  Japan................................ 423/534

*Primary Examiner*—O. R. Vertiz
*Assistant Examiner*—Gary P. Straub
*Attorney, Agent, or Firm*—Burgess, Dinklage & Sprung

[57] ABSTRACT

Gases having a high $SO_2$ content are catalytically reacted with oxygen in catalyst contacting trays to form $SO_3$. The catalyst in the first contacting tray is different from the catalyst in the second contacting tray. The feedstock gases are reacted in the first contacting tray in contact with a vanadium pentoxide based catalyst and the effluent gas from the first contacting tray is fed to a second contacting tray without interstage cooling and is reacted therein in contact with an iron oxide based catalyst.

6 Claims, 3 Drawing Figures

PROCESS FOR CATALYTICALLY REACTING GASES HAVING A HIGH SO₂ CONTENT USING DIFFERENT CATALYSTS

BACKGROUND

This invention relates to a process for catalytically reacting gases having a high $SO_2$ content with oxygen catalyst containing contacting trays to form $SO_3$ wherein the first contacting tray contains a catalyst which differs from that in the second contacting tray.

During the reaction of $SO_2$-containing gases to form $SO_3$, which is subsequently used to produce sulfuric acid, the catalyst must be heated first by the gas to the so-called initiation temperature. This initiation temperature depends on the composition of the catalyst and on the process by which it has been made and, e.g., with catalysts based on vanadium pentoxide ($V_2O_5$) is about 400°–450°C. The reaction of $SO_2$ to form $SO_3$ results in a temperature rise because the reaction is exothermic. With gases which contain up to about 11 % $SO_2$, the reaction is arrested at temperatures of about 620°C., where the equilibrium of the reaction $SO_2 + \frac{1}{2}O_2 \rightleftarrows SO_3$ is reached. With gases having a higher $SO_2$ content, the temperature continues to rise because the reaction reaches its equilibrium only at higher temperatures. However, the catalyst will deteriorate at temperatures above about 620°C.

Several processes of heating gases having a high $SO_2$ content have been proposed whereby deterioration of the catalyst by overheating is avoided. For instance, it is known to reduce the $SO_2$ content of the feed gases by admixing partly reacted gases, which contain $SO_3$, with the starting gases (DAS No. 1,054,431; German Pat. No. 504,635; DOS No. 2,026,818). In these processes, however, gas must be passed through the contacting trays at a high rate which increases with the $SO_2$ content. It is also difficult technologically to accomplish a uniform blending of the gases and the contacting vessel must be larger in accordance with the gas recycle rate.

It is also known to react gases which contain up to 14% $SO_2$ under conditions involving a deficiency of oxygen and to supply cold dry air to the gases in stages in order to cool the gases and to add oxygen thereto (U.S. Pat. No. 2,180,727).

This process has the following disadvantages: In the case of a moderate $SO_2$ content, a temperature rise above the range which is permissible for the catalyst may be prevented by a control of the oxygen deficiency but air must be added at an automatically controlled rate after each contacting tray. In the case of higher $SO_2$ content, e.g., above 20%, air must be admixed and in addition thereto the gases must be subjected to an indirect interstage cooling between the several contacting trays because a cooling only by an injection of air would result in an oxygen surplus and unpermissible temperature rise in the next contacting tray. A considerable expenditure is required for the admixing of the air to the gas with the uniformity which is required.

It is also known in the case of gases which contain about 8–11% $SO_2$ to conduct a partial stream at a velocity of flow of 0.6–2 meters per second through a preliminary contacting tray, which precedes the main contacting tray, whereafter the $SO_3$-containing gases which leave the preliminary contacting tray are admixed with colder gases which contain $SO_2$ and the mixed gases are reacted in the conventional manner in the main contacting tray (Austrian Pat. application No. 10932/68). In this process, a separate preliminary contacting tray is required and highly concentrated gases cannot be treated unless a plurality of preliminary contacting trays are provided.

In connection with the reaction of $SO_2$-containing gases in a contacting tray, it is also known to control the peak temperature by varying the $V_2O_5$ content of the catalysts Helv. chim. Akta 24, Reprint No. 71 E - 79 E, 13/12, 1941, Basel, Ges. f. chem. Ind.). If that process were used to treat gases having a high $SO_2$ content, the reaction would have to be interrupted when a temperature of about 620°C. has been reached, and an interstage cooling would then be required.

If these processes, only a relatively limited temperature range, and in conjunction therewith, only a limited conversion range is available for each contacting tray because the reaction is adiabatic. Where catalysts based on vanadium pentoxide ($V_2O_5$) are used, that temperature range is from about 400° to 620°C. When the upper temperature limit has been reached, the reaction in each contacting tray must be interrupted and the gases must be subjected to interstage cooling before they may be admitted into the next contacting tray.

It is also known to provide series-connected contacting trays which contain different catalysts. In these processes (German Pat. No. 136,134, German Pat. No. 682,915, U.S. Pat. No. 1,965,963, U.S. Pat. No. 2,042,675), the first contacting tray is operated at a higher temperature than the second contacting tray. Besides, these processes are not used to treat gases having a high $SO_2$ content. Disadvantages would be involved in the use of these processes to treat gases having a high $SO_2$ content.

SUMMARY

It is an object of the invention to avoid or reduce in the processing of gases having a high $SO_2$ content the disadvantages of the known processes and specifically to reduce the number of interstage cooling steps previously required between the contacting trays for a given total conversion and yet to avoid a deterioration of the catalysts.

Thus, the invention provides a process for catalystically reacting gases having a high $SO_2$ content with oxygen in catalyst contacting trays to form $SO_3$ wherein the catalyst in the first contacting tray is different from the catalyst in the second contacting tray. Included in the process of the invention are the steps of reacting said gases in the first contacting tray in contact with a vanadium pentoxide based catalyst and feeding the effluent gases from the first contacting tray to the second contacting tray without interstage cooling and reacting said effluent gases therein in contact with an iron oxide based catalyst.

DESCRIPTION OF THE DRAWING

The present invention will be more fully understood from the following description taken in conjunction with the accompanying drawing wherein.

DESCRIPTION

Figure 1:
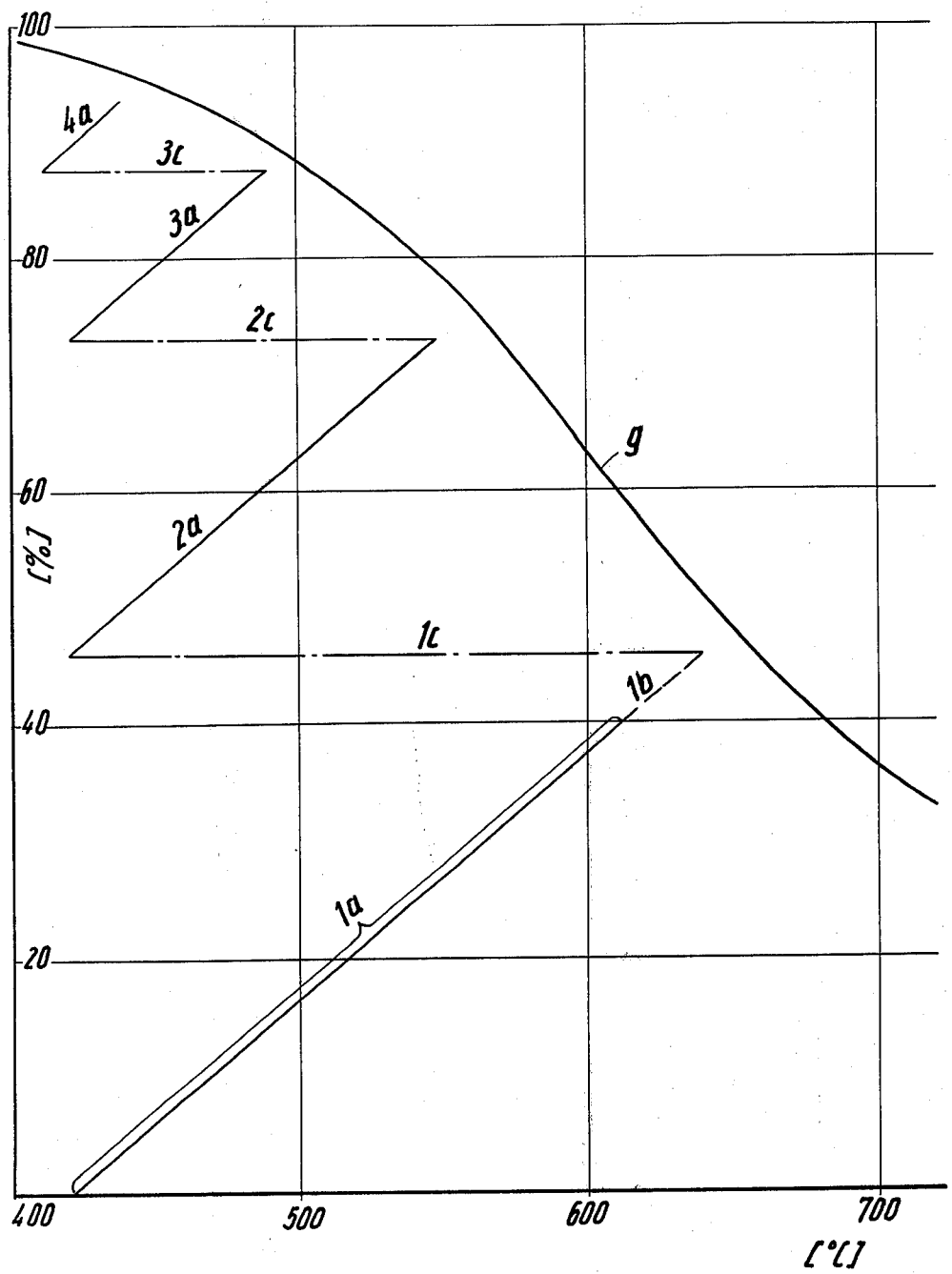
FIGS. 1–3 are graphs plotting the conversion of $SO_2$ to $SO_3$ against temperature.

The process according to the invention may be used to treat gases which contain about 11–60% $SO_2$.

The second contacting tray may be disposed directly above or below the first contacting tray so that both contacting trays constitute a double contacting tray. The gases are admitted into the first contacting tray at the operating temperature of the catalyst. This is usually somewhat higher than the initiation temperature of the catalyst concerned. The reaction is conducted until the temperature has increased to the highest value which is permissible without a deterioration of the catalyst, or to a lower temperature, which results in an optimum conversion. This temperature is controlled by a selection of a suitable residence time of the gas in the contacting tray. The residence time is controlled so that $SO_2$ is converted into $SO_3$ to such an extent that the temperature rises only to the values stated. At this temperature, the gases are directly transferred into the second contacting tray, in which they are reacted further, preferably to the equilibrim temperature because these catalysts will not be deteriorated unless heated to much higher temperatures.

In the contacting tray which contains a catalyst based on vanadium pentoxide, the $V_2O_5$ content of the catalyst is preferably selected in accordance with the known method so that the rate of the reaction $SO_2 + ½ O_2 \rightleftharpoons SO_3$ is reduced so as to provide for a technologically desirable residence time. Besides, the reaction rate may be reduced by an addition of reaction-retarding substances, such as manganese oxide.

According to a preferred feature, the reaction in the first contacting tray is conducted until a temperature of about 550°–620°C. has been reached and the reaction in the second contacting tray is conducted until a temperature of about 690°–760°C. has been reached. Particularly desirable conversions are accomplished at these temperatures.

Another preferred feature resides in that the gases are cooled when they have left the second contacting tray, the gases are reacted in the third contacting tray in contact with a catalyst based on vanadium pentoxide, and the gases leaving the third contacting tray are supplied to the fourth contacting tray without interstage cooling and in the fourth contacting tray are reacted further in contact with a catalyst based on iron oxide. In these contacting trays, the reactions are carried out in analogy to those in the first and second contacting trays, respectively, but at the temperatures which are applicable to the third and fourth contacting trays. These contacting trays may also be arranged one over the other to form a double contacting tray.

According to a preferred feature, the reaction in the third contacting tray is conducted to a temperature of about 550°–620°C. and the reaction in the fourth contacting tray is conducted to a temperature of about 630°–710°C. Particularly desirable conversions are accomplished at these temperatures.

In further combined double contacting trays containing catalysts which are based on vanadium pentoxide and catalysts which are based on iron oxide, the reaction may be continued until the equilibrium temperature of the gases during the reaction is approximately as high as the maximum temperature which is permissible for the vanadium catalysts.

The final temperature in the contacting trays which contain catalyst based on iron oxide will depend on the $SO_2$ content of the gas which enters the respective contacting tray. The temperature will shift toward the upper limit of the stated temperature range in case of a relatively high $SO_2$ content and to the lower limit in case of a relatively low $SO_2$ content.

According to another preferred feature, the catalyst based on vanadium pentoxide and the catalyst based on iron oxide form two separate layers, which are disposed one over the other on a common grate, and an inert heat-insulating layer, which is permeable to gas, is disposed between the two catalyst layers. As a result, a transfer of heat from the contacting tray which contains catalyst based on iron oxide to the catalyst based on vanadium pentoxide is avoided. This is particularly important during a shutdown. Besides, a grate is eliminated which would be subjected to very high temperatures.

According to another preferred feature, the gas is conducted through the contacting trays from bottom to top so that the gas permeability of the catalyst bed is not reduced by a deposition of fine solids.

Behind each double contacting tray, the gases leaving the tray are indirectly and/or directly cooled to the operating temperature prevailing at the inlet of the next contacting tray. In case of a relatively high $SO_2$ content, an at least partly indirect cooling is required in each case because a cooling effect only by admixing oxygen-containing gases would result in a great increase of the gas volume. Preferably the cooling is effected indirectly because in that case the gas volume will not be increased and constant operating conditions will be obtained.

The invention is applicable to processes in which the $SO_3$ which has been formed is or is not subjected to interstage absorption.

The invention will now be explained with reference to FIGS. 1 to 3.

In the drawings, the conversion of $SO_2$ to $SO_3$ is plotted in dependence on the gas temperature. Curve g is the equilibrium curve of the reaction $SO_2 + ½ O_2 \rightleftharpoons SO_3$.

The solid lines (———) 1a to 7a represent the reaction of the gas in the contacting trays which contain a catalyst based on vanadium pentoxide.

The dotted lines ( - - - - - ) 1b and 3b represent the reaction of the gas in the contacting trays which contain a catalyst based on iron oxide.

The dash-dot lines (— - —) 1c to 6c represent the interstage cooling steps.

FIG. 1 represents the process for a gas which contains 15% $SO_2$ and 8% $O_2$.

Figure 2:
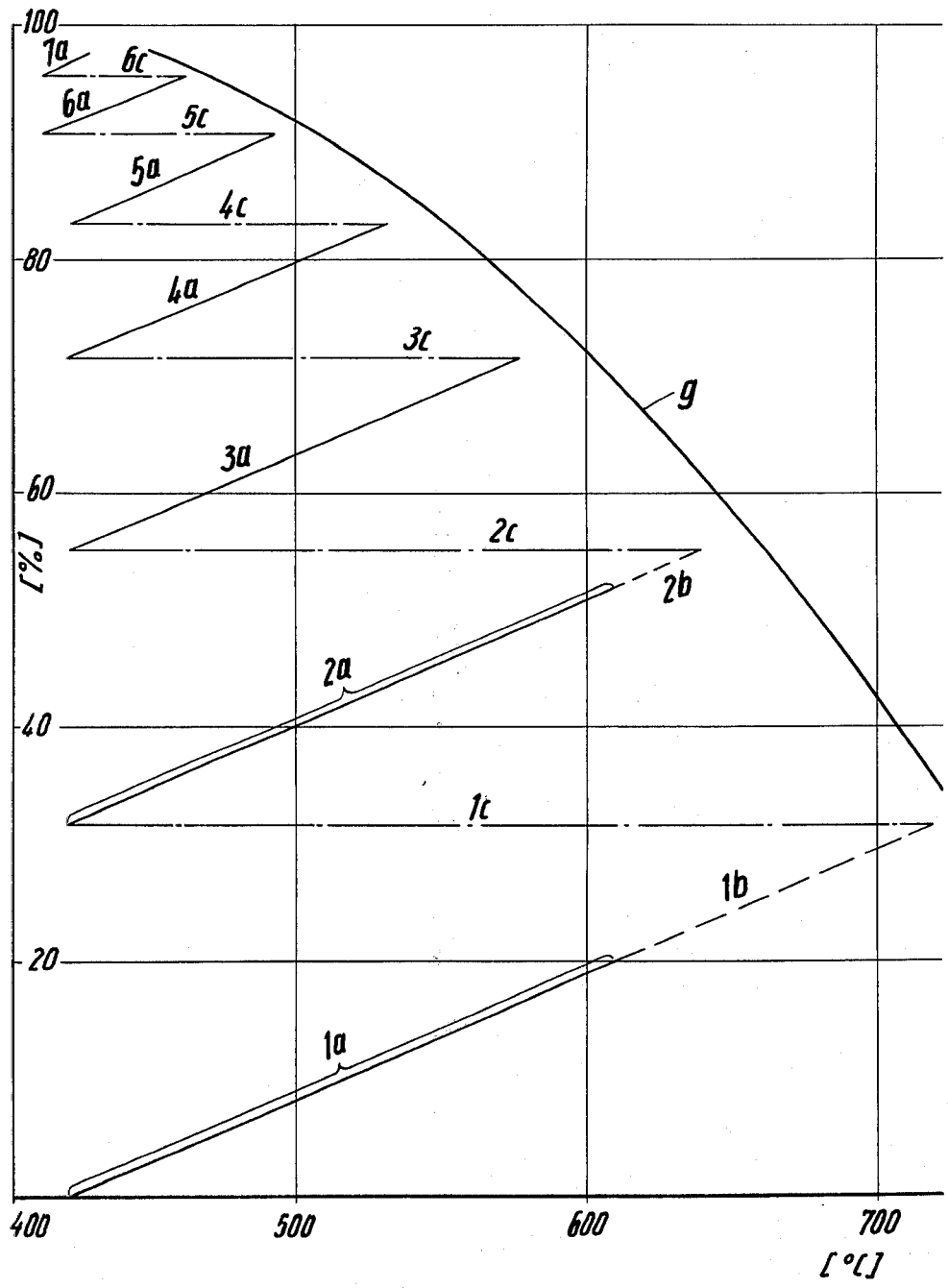

FIG. 2 shows the process for a gas which contains 35% $SO_2$ and 20% $O_2$.

Figure 3:
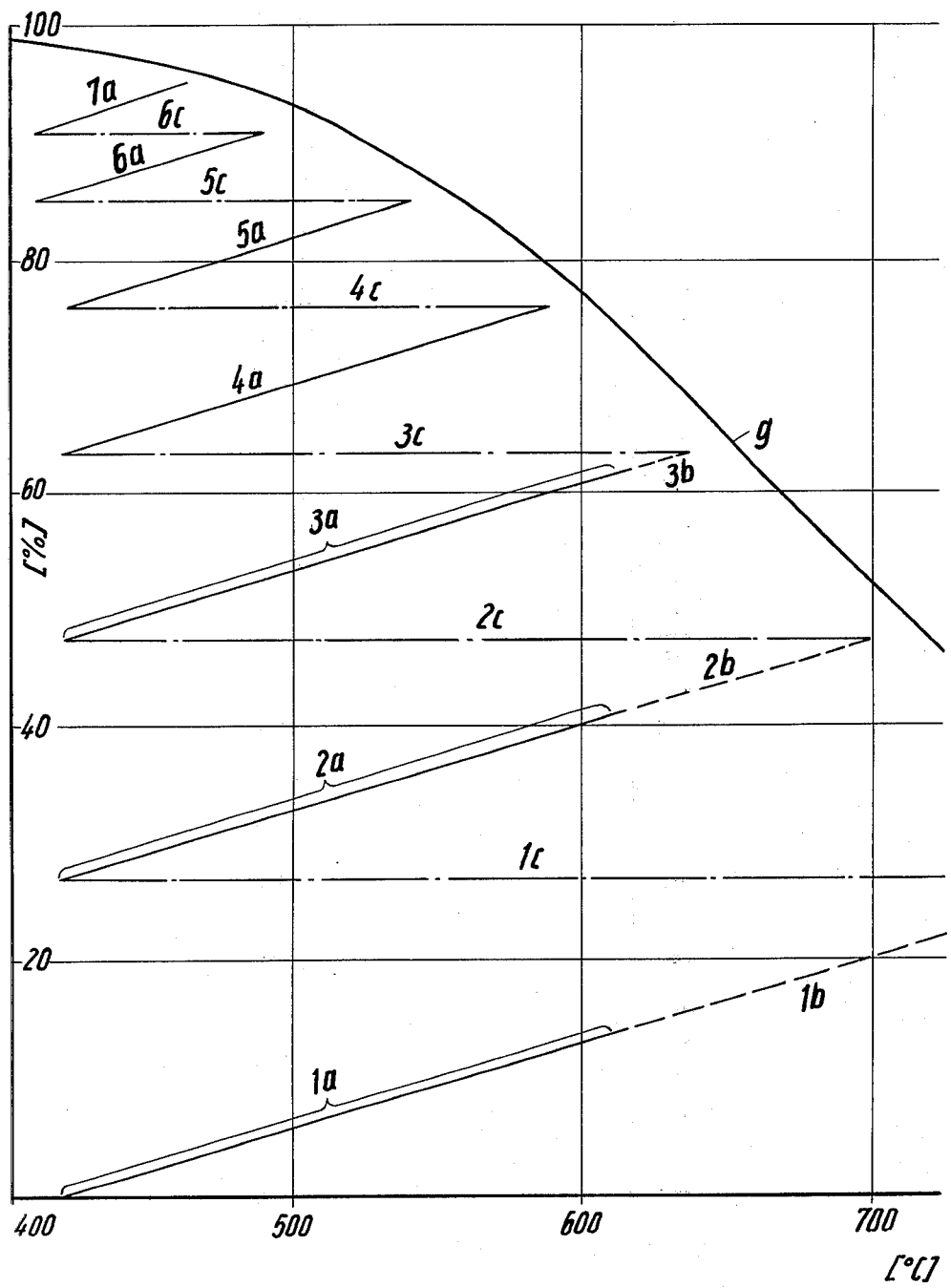

FIG. 3 shows the process for a gas which contains 60% $SO_2$ and 35% $O_2$.

The advantages of the invention reside in that the number of interstage cooling steps to which the gases must be subjected between the contacting trays is reduced for a given total conversion so that the capital requirement and operating costs are much reduced. Besides, there is a very high temperature difference between the gases to be cooled and the cooling fluid so that smaller heat exchange surfaces are sufficient for the indirect cooling.

The catalysts on the basis of $V_2O_5$ and used in those contacting trays in which a deterioration is possible due to the fact that the reaction of $SO_2 + ½ O_2 \rightleftharpoons SO_3$ is not arrested at temperatures of about 620°C, may be of commercial quality, for example as manufactured by BASF (Catalyst 04 - 10 and 04 - 11). Preferably the reactivity of the catalysts is decreased by varying the $V_2O_5$ content as known for instance from Helv. chim. Akta 24, Reprint No. 71 E - 79 E, 13/12, 1941, Basel, Ges. f. chem. Ind., or by an addition of reaction retarding substances such as manganese dioxyde as known from Journal of Catalysis 18 (1970), pages 83–89.

The catalysts on the basis of iron oxide consist preferably of $Fe_2O_3$ as known from Waeser, Handbuch der Schwefelsaurefabrikation, 1930, pages 1476/77.

The catalysts on the basis of $V_2O_5$ and used in those contacting trays in which the reaction $SO_2 + \frac{1}{2} O_2 \rightleftharpoons SO_3$ is arrested at temperatures below about 620°C are of commercial quality as described above.

EXAMPLES

Example 1 describes FIG. 1, Example 4 describes FIG. 2 and Example 6 describes FIG. 3.

In Examples 2, 3, 5, 7 and 8 the conversion was conducted until the ratio of $SO_2$ to $SO_3$ was such as to enable a subsequent catalysis to be carried out in known manner.

The catalysts on the basis of $V_2O_5$ and used in those contacting trays in which a deterioration by overheating was possible consisted of kieselgur as carrier substance with 8 % by weight of $V_2O_5$ and 3 % by weight of $MnO_2$ (see Journal of Catalysis 18, (1970), pages 83–89). In the Tables they are marked with "A".

The catalysts on the basis of iron oxide consisted of $Fe_2O_3$ (see Waeser, Handbuch der Schwefelsaurefabrikation, 1930, pages 1476–77). In the Tables they are marked with "Fe".

The catalyst on the basis of $V_2O_5$ and used in those contacting trays in which a deterioration by overheating was not possible, consisted of Catalyst 04 - 11 manufactured by BASF. In the Tables they are marked with "B".

In the Tables, columns 1 to 7 contain the following data:

Column 1: Consecutive number of contacting trays
Column 2: Type of catalyst
Column 3: Height of the catalyst in meters
Column 4: Temperature of the gas entering the contacting tray in °C
Column 5: Temperature of the gas leaving the contacting tray in °C
Column 6: Total conversion of the gas as it enters the contacting tray in %
Column 7: Total conversion of the gas as it leaves the contacting tray in %.

EXAMPLE 1

Composition of the gas entering the first contacting tray: 15,0% $SO_2$, 8,0% $O_2$

| 1 | 2 | 3 | 4 | 5 | 6 | 7 |
|---|---|---|---|---|---|---|
| 1a | A | 0,4 | 420 | 610 | 0 | 40 |
| 1b | Fe | 1,0 | 610 | 640 | 40 | 46 |
| 2a | B | 0,6 | 420 | 548 | 46 | 73 |
| 3a | B | 0,8 | 420 | 488 | 73 | 87 |
| 4a | B | 0,8 | 410 | 439 | 87 | 93 |

EXAMPLE 2

Composition of the gas entering the first contacting tray: 15,0% $SO_2$, 8,0% $O_2$

| 1 | 2 | 3 | 4 | 5 | 6 | 7 |
|---|---|---|---|---|---|---|
| 1a | A | 0,4 | 440 | 610 | 0 | 38,6 |
| 1b | Fe | 1,0 | 610 | 646 | 38,6 | 46,8 |

EXAMPLE 3

Composition of the gas entering the first contacting tray: 30,0% $SO_2$, 20,0% $O_2$

| 1 | 2 | 3 | 4 | 5 | 6 | 7 |
|---|---|---|---|---|---|---|
| 1a | A | 0,4 | 440 | 610 | 0 | 21,4 |
| 1b | Fe | 1,0 | 610 | 746 | 21,4 | 38,4 |

EXAMPLE 4

Composition of the gas entering the first contacting tray: 35,0% $SO_2$, 20,0% $O_2$

| 1 | 2 | 3 | 4 | 5 | 6 | 7 |
|---|---|---|---|---|---|---|
| 1a | A | 0,3 | 420 | 610 | 0 | 20 |
| 1b | Fe | 1,0 | 610 | 719 | 20 | 31,5 |
| 2a | A | 0,4 | 420 | 610 | 31,5 | 52 |
| 2b | Fe | 1,0 | 610 | 644 | 52 | 59 |
| 3a | B | 0,6 | 420 | 578 | 59 | 71 |
| 4a | B | 0,6 | 420 | 530 | 71 | 83 |
| 5a | B | 0,8 | 420 | 492 | 83 | 90 |
| 6a | B | 0,8 | 410 | 459 | 90 | 95,5 |
| 7a | B | 0,8 | 410 | 427 | 95,5 | 97,5 |

EXAMPLE 5

Composition of the gas entering the first contacting tray: 35,0% $SO_2$, 20,0% $O_2$

| 1 | 2 | 3 | 4 | 5 | 6 | 7 |
|---|---|---|---|---|---|---|
| 1a | A | 0,3 | 440 | 610 | 0 | 18,7 |
| 1b | Fe | 1,0 | 610 | 761 | 18,7 | 35,4 |
| 2a | A | 0,4 | 440 | 610 | 35,4 | 43,8 |
| 2b | Fe | 1,0 | 610 | 645 | 43,8 | 57,6 |

EXAMPLE 6

Composition of the gas entering the first contacting tray: 60,0% $SO_2$, 35,0% $O_2$

| 1 | 2 | 3 | 4 | 5 | 6 | 7 |
|---|---|---|---|---|---|---|
| 1a | A | 0,3 | 420 | 610 | 0 | 14,0 |
| 1b | Fe | 1,0 | 610 | 790 | 14,0 | 27,0 |
| 2a | A | 0,4 | 420 | 610 | 27,0 | 41,0 |
| 2b | Fe | 1,0 | 610 | 700 | 41,0 | 47,5 |
| 3a | A | 0,6 | 420 | 610 | 47,5 | 61,5 |
| 3b | Fe | 0,8 | 610 | 638 | 61,5 | 63,5 |
| 4a | B | 0,8 | 420 | 590 | 63,5 | 76,0 |
| 5a | B | 0,8 | 420 | 541 | 76,0 | 85,0 |
| 6a | B | 0,8 | 410 | 490 | 85,0 | 91,0 |
| 7a | B | 0,8 | 410 | 478 | 91,0 | 94,5 |

EXAMPLE 7

| Composition of the gas entering the first contacting tray | | | | 55,0% SO$_2$ 30,0% O$_2$ | | |
|---|---|---|---|---|---|---|
| 1 | 2 | 3 | 4 | 5 | 6 | 7 |
| 1a | A | 0,3 | 440 | 620 | 0 | 14,1 |
| 1b | Fe | 1,0 | 620 | 767 | 14,1 | 25,7 |
| 2a | A | 0,4 | 440 | 620 | 25,7 | 39,5 |
| 2b | Fe | 1,0 | 620 | 717 | 39,5 | 47,0 |
| 3a | A | 0,6 | 440 | 600 | 47,0 | 59,1 |
| 3b | Fe | 0,8 | 600 | 641 | 59,1 | 62,2 |

EXAMPLE 8

| Composition of the gas entering the first contacting tray | | | | 60,0% SO$_2$ 35,0% O$_2$ | | |
|---|---|---|---|---|---|---|
| 1 | 2 | 3 | 4 | 5 | 6 | 7 |
| 1a | A | 0,3 | 440 | 620 | 0 | 13,5 |
| 1b | Fe | 1,0 | 620 | 762 | 13,5 | 24,2 |
| 2a | A | 0,4 | 440 | 620 | 24,2 | 37,3 |
| 2b | Fe | 1,0 | 620 | 736 | 37,3 | 45,7 |
| 3a | A | 0,6 | 440 | 610 | 45,7 | 57,8 |
| 3b | Fe | 0,8 | 610 | 657 | 57,8 | 61,1 |

What is claimed is:

1. Process for catalytically reacting gases containing 11°-60°% SO$_2$ with oxygen in catalyst contacting trays to form SO$_3$, wherein the catalyst in the first contacting trays is different from the catalyst in the second contacting tray which comprises reacting said gases in the first contacting tray in contact with a vanadium pentoxide based catalyst and feeding the effluent gases from the first contacting tray to the second contacting tray without cooling and reacting said effluent gases therein in contact with an iron oxide based catalyst.

2. Process of claim 1 wherein the reaction in the first contacting tray is carried out until a temperature of about 550°–620°C. is reached and the reaction in the second contacting tray is carried out until a temperature of about 690°–760°C is reached.

3. Process of claim 1 wherein effluent gases from the second contacting tray are cooled are reacted in a third contacting tray in contact with a vanadium pentoxide based catalyst and the effluent gases from the third contacting tray are fed to a fourth contacting tray without cooling and are reacted therein contact with an iron oxide based catalyst.

4. Process of claim 3 wherein the reaction in the third contacting tray is carried out to a temperature of about 550°–620°C. and the reaction in the fourth contacting tray is carried out to a temperature of about 630°–710°C.

5. Process of claim 1 wherein the vanadium pentoxide and the iron oxide catalysts are in two separate layers one over the other on a common grate with an inert, gas permeable, heat-insulating layer therebetween.

6. Process of claim 1 wherein the gases are conducted through the contacting trays from bottom to top.

* * * * *